Sept. 2, 1941.  H. R. MOULTON  2,254,440
MULTIFOCAL LENS AND METHOD OF MAKING SAME
Filed Aug. 18, 1939
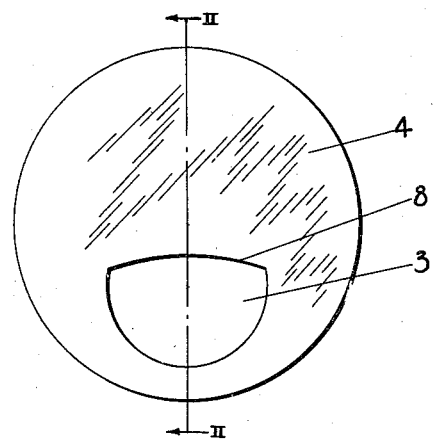
Fig. I
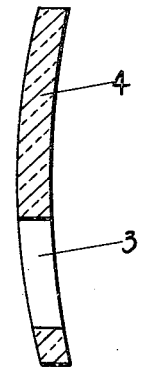
Fig. II
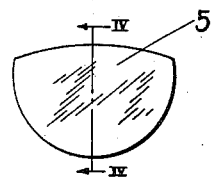
Fig. III
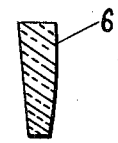
Fig. IV
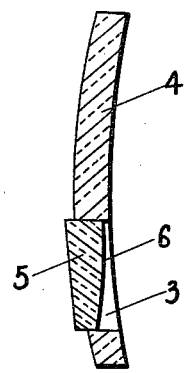
Fig. V
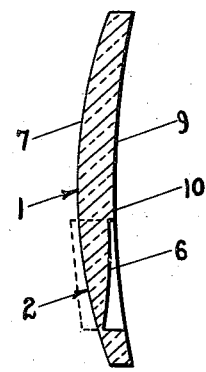
Fig. VI
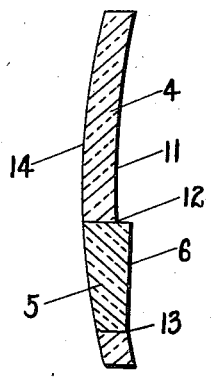
Fig. VII
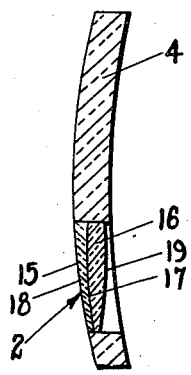
Fig. VIII
INVENTOR.
HAROLD R. MOULTON
BY Harry H. Styll
ATTORNEY.

Patented Sept. 2, 1941

2,254,440

UNITED STATES PATENT OFFICE 2,254,440

MULTIFOCAL LENS AND METHOD OF MAKING SAME

Harold R. Moulton, Southbridge, Mass., assignor to American Optical Company, Southbridge, Mass., a voluntary association of Massachusetts Application August 18, 1939, Serial No. 290,873

2 Claims. (Cl. 88—54)

This invention relates to an improved multifocal lens and method of making the same.

One of the principal objects of the invention is to provide novel means and method for forming a multifocal lens having a major focal field and a minor focal field, with each of said focal fields having its optical center, its contour shape, and optical characteristics separately controllable.

Another object of the invention is to provide novel means and method for forming a multifocal lens having a minor focal field of any desired contour shape, with the minor focal field in any desired location with respect to the optical center of the major focal field of the lens and with the center of the minor focal field in any desired controlled position.

Another object is to provide a finished multifocal lens having the appearance of a one-piece lens with a depressed minor focal field and improved and novel method of making the same.

Other objects and advantages of the invention should become apparent from the following description taken in connection with the accompanying drawing, and it will be apparent that many changes may be made in the details of construction, arrangement of parts and steps of the process shown and described without departing from the spirit of the invention as expressed in the accompanying claims. I, therefore, do not wish to be limited to the exact details of construction, arrangement of parts, and steps of the process shown and described as the preferred form only has been given by way of illustration.

Referring to the drawing:

Fig. I is a front elevation of a blank illustrating one step in the process of manufacture;

Fig. II is a sectional view taken as on line II—II of Fig. I and looking in the direction indicated by the arrows;

Fig. III is a face view of the segment or minor portion of the lens;

Fig. IV is a sectional view taken as on line IV—IV of Fig. III;

Fig. V is a sectional view similar to Fig. II, showing the segment in assembled relation with the major portion of the lens and illustrating one form of the invention;

Fig. VI is a view similar to Fig. V of the major and minor portions after they have been fused and one of the surfaces of the blank has been finished;

Fig. VII is a view similar to Fig. V, illustrating a modified form of the invention; and Fig. VIII is a sectional view similar to Fig. VII of a further modification of the invention.

The gist of the invention is to provide a finished lens having the appearance and advantages of a one-piece type lens, so arranged that the powers of the major and minor portion of the lens may be separately and independently controlled, and the optical centers of the respective fields may also be independently controlled in a relatively simple and efficient manner.

The primary feature of the invention is to provide a lens blank having a minor focal field with a finished optical surface whereby the respective outer surfaces of the major focal field may be provided with any desired surface curvature combinations without altering the finished surface of the minor field, whereby any desired prism and cylindrical corrections or combinations of said corrections, together with spherical, cylindrical, or prismatic corrections may be introduced without altering the finished optical surface on said minor focal field.

Referring more particularly to the drawing, wherein like characters of reference designate like parts throughout the several views, the lens embodying the invention comprises a major focal field 1 and a minor focal field 2. This lens is produced by forming an opening 3 in a major piece of lens medium 4 to any desired size and contour shape.

It is to be understood that although only one shape is illustrated in the drawing, the contour of the opening 3 may be square, oblong, rectangular, circular, semi-circular, or any other desirable shape.

The major piece of lens medium 4 may be formed of any desirable optical glass or synthetic resinous materials. A minor piece of lens medium 5 having substantially the same index of refraction as the major piece of lens medium 4 is shaped to the contour shape and size of the opening 3 so as to have a relatively intimate fit in said opening. The minor piece of lens medium 5 is provided with an optical surface 6 of a controlled curvature depending upon the power desired in the minor focal field 2 of the lens. This surface 6 may be spherical, cylindrical, or of any shape desired. The minor piece 5 is fitted within the opening 3 with the surface 6, as shown in Fig. V, preferably located between the outer opposed surfaces of the major piece 4. This minor piece 6 may be secured in said major piece by suitable adhesive or by fusion.

Due to the fact that the major and minor pieces of lens medium are preferably of the same index of refraction, the interconnected edge surfaces thereof will be invisible, or substantially so.

Due to the fact that the surface 6 is located between the opposed outer surfaces of the blank, as illustrated in Fig. V, any desirable surface curvatures may be formed on said major piece of lens medium within the limitations of the depth of the recess 3, formed by securing the minor portion 5 in the major portion without altering the curvature of the surface 6. This enables the optical centers of the respective focal fields to be shifted to any desired relation with each other by simple, known grinding and polishing operations.

In finishing the lens blank a continuous optical surface 7 is formed on one side thereof, as illustrated in Fig. VI. This optical surface may be spherical, cylindrical, or of any other desired shape. If it is desired to locate the optical center substantially at the dividing line 8, between the two focal fields, the surface 7 is tilted with respect to the surface 6, so as to cause the thickest portion of the minor piece 5 to lie on said line of division 8. If it is desired to position the optical center of the minor focal field 2 below said line of division 8, the angle of the surface 7 relative to the surface 6 is altered accordingly. This is commonly known in the art.

The final prescriptive surface 9 is formed on the opposed side of the blank and is ground to a depth which will reduce the cliff-like edge 10 to a minimum.

It is to be understood that the upper edge of the minor portion 5 may be made to blend with the surface 9, if desired. This is accomplished by completely grinding away the cliff-like edge 10.

The optical center of the major focal field 1 may be shifted to any desired relation with the line of division 8 during the forming of the prescriptive curve 9 by known methods.

In Fig. VII there is illustrated a modified form of the invention. In this instance the major portion 4 is provided with a finished optical surface 11 of a desired curvature prior to the securing of the minor portion 5 in the opening 3.

It is also to be understood that the desired optical surface 6 is formed on the minor portion 5 prior to joining it with the major portion. When assembling the major and minor portions as illustrated in Fig. VII, the minor portion is so related with the major portion that it protrudes outwardly of the surface 11 and forms a cliff-like upper edge 12. The lower edge 13 may be positioned in flush relation with the surface 11, or may outset or inset a predetermined amount as desired. By insetting the lower edge, the width of the upper edge may be proportionally reduced.

The opposed side 14 of the blank is provided with the prescriptive curve. This curve may be of any of the known optical surface curvatures and is computed so that when combined with the surfaces 11 and 6 it will introduce the powers desired in the respective finished focal fields of the lens.

It is also to be noted that any desired prism power may be introduced in the major focal field of the lens and any desired prism power may be introduced in the minor focal field of the lens, with the said prism powers independently controlled. This is accomplished in the major focal field of the lens by angling the surfaces 11 and 14 to desired relation with each other and along given meridians, in order to reduce base in, out, up or down prism. A similar angle is imparted to the surfaces 14 and 6 of the minor piece of lens medium, so as to introduce base in, out, up or down prism in said minor focal field. This also applies to the lens illustrated in Figs. I to VI inclusive.

It is also to be noted that the lens mediums for the portions 4 and 5 may be of any controlled color and may possess similar or different absorptive characteristics for any portion of the spectrum.

Although applicant has specified the use of glasses of the same indices of refraction for the major and minor portions of the lens, any desired combination of glasses or resinous materials of different controlled indices of refraction may be used.

In Fig. VIII the minor focal field 2 is formed of composite pieces of lens medium 15 and 16. In this instance the portion 15 has a different index of refraction and a different reciprocal relative dispersion. Although the portions 15 and 16 are of different indices of refraction, one of said portions may be made of the same index of refraction as the major portion 4, thereby reducing edge reflections.

In this particular instance the portion 16 is of a relatively low index of refraction, simulating the index of refraction of the major portion 4, with a relatively high nu value and the portion 15 having a relatively high index of refraction and a relatively low nu value, with the curvatures at the interface 17 such that when combined with said nu values, together with the indices of refraction and exterior surface curvatures 18 and 19, they will produce an achromatic reading portion having a given focal power. The nu values, indices of refraction, and surface curvatures of the respective parts may be so controlled as to produce a truly achromatic reading portion. The method of computing these surfaces and selecting of suitable glasses is known in the art.

The method of forming the lenses otherwise is generally similar to that set forth above in connection with the other forms of the invention.

With this particular construction of lens it is possible to furnish the trade with a series of blanks such as illustrated in Fig. II, having a finished surface on one or both sides thereof, with the said surfaces graded in optical powers such as is commonly known in the art, that is, in steps of quarter or eighth diopters. There may also be provided a plurality of minor portions 5 having surfaces 6 thereon likewise graded in powers.

The optician or dispenser may select any combination he desires and may assemble the minor portion with the major portion and thereafter form the prescriptive curve on the blank, in instances wherein only one side has been previously finished.

In instances when the segment 5 is fused to the major portion 4, careful temperature controls are essential so as to avoid injuring the finished optical surfaces on said major and minor portions. This fusion may be more successfully performed by having a relatively intimate fit at the interfaces between the minor portions 5 and the major portions 4, or a low fusion glass may be used as a cementing means, in which instance this glass could have the same index of refraction as the major and minor pieces, so that the fusion surface will be relatively invisible in the finished lens.

In the case of nonglass lenses, organic binding materials having essentially the same indices of refraction as the minor and major portions may be used.

The outer contour surfaces of the minor pieces of lens medium 5 and the surfaces of the walls of the openings 3 may be formed to different surface textures. For example, these surfaces may be rough ground, have grooves or screw threads or the like, or may be polished.

In instances when the walls of the openings 3 are provided with a screw thread, the minor portions 5 could be so shaped in contour as to be provided with similar screw threads, so that the said minor portions may be threaded into the major portions. This, of course, would require the minor portion 5 and the opening 6 to have a circular contour.

It is to be noted that lenses of the lenticular type may be formed by this process, in which instance the main lens portion will be embodied in a minor piece of lens medium and the outer supporting portion of the lenticular would simulate the major portion 4 of the lens described herein. In this instance the major portion would constitute the supporting portion of the lenticular and would be formed relatively thin as compared with the main lens portion of said lenticular.

From the foregoing description it will be seen that simple, efficient and economical means have been provided for accomplishing all of the objects of the invention.

Having described my invention, I claim:

1. The method of forming a multifocal lens comprising forming an opening of a given contour shape and size in a major piece of lens medium of a given index of refraction with the said opening having substantially parallel cliff-like walls, forming a segment member to substantially the same size and shape as the opening in the major piece, said segment comprising at least as a portion thereof, in the finished lens, lens medium of sensibly the same index of refraction as the major piece of lens medium, forming a finished optical surface on one side of said segment member to control, in part, the optical power desired of said segment and angularly disposing said surface so as to cause said segment to have a relatively thick edge portion of a thickness substantially the same as the thickness of the major piece of lens medium in the vicinity of the opening and to have a relatively thin edge portion, fitting and securing said segment member in the opening in the lens, with its edge surfaces in intimate relation with the edge surfaces of the opening and with its finished optical surface lying within the opening and below the adjacent side surface of the major piece of lens medium to cause a surrounding cliff-like wall to remain about said surface, forming a continuous optical surface on the major piece of lens medium and the segment member on the side thereof opposite the first finished surface of the segment to complete the optical power desired of said segment member and to control, in part, the optical power desired in the major piece of lens medium and forming a finished optical surface on the opposed side of said major piece of lens medium and to such a depth as to reduce the thickness of the cliff-like wall at the dividing line between the thick portion of the segment and the major piece of lens medium to a minimum with the remaining portion of the cliff-like wall of a greater thickness.

2. A multifocal lens comprising a major piece of lens medium of a relatively low index of refraction having an opening of a given controlled size and shape therein with a cliff-like wall surrounding said opening and having opposed finished optical surfaces of controlled curvature to produce the focal power desired through said major portion, a composite minor portion composed of two superimposed layers of lens medium secured together along contiguous surfaces finished to a given controlled optical curvature and having a contour shape and size simulating the contour shape and size of the opening in the major piece of lens medium and secured in said opening in edge to edge relation and in relatively intimate relation with the walls of said opening, said composite minor portion being composed of a convex component of a low index of refraction simulating the index of refraction of the major piece of lens medium and having a high nu value and a concave component having a relatively high index of refraction and a low nu value, said convex component being positioned internally of the opening in the lens intermediate the outer surfaces of the lens and said concave component having an outer surface continuous and substantially flush with one of the finished outer surfaces of the major portion of the lens, the opposed finished optical surface on the major portion of the lens being formed to such a depth as to reduce the cliff-like wall along the dividing line between the major and minor focal fields of the lens to a minimum with the said exposed surface of the convex component of the minor portion of the lens lying below the surface on said side of the major portion of the lens.

HAROLD R. MOULTON.